(12) United States Patent
Aue

(10) Patent No.: US 6,735,513 B2
(45) Date of Patent: May 11, 2004

(54) METHOD AND DEVICE FOR RUNNING UP A CONTROL UNIT FOR A MOTOR VEHICLE

(75) Inventor: Axel Aue, Korntal-Muenchingen (DE)

(73) Assignee: Robert Bosch GmbH, Stuttgart (DE)

(*) Notice: Subject to any disclaimer, the term of this patent is extended or adjusted under 35 U.S.C. 154(b) by 231 days.

(21) Appl. No.: 09/914,412
(22) PCT Filed: Dec. 21, 2000
(86) PCT No.: PCT/DE00/04582
§ 371 (c)(1), (2), (4) Date: Dec. 18, 2001
(87) PCT Pub. No.: WO01/48360
PCT Pub. Date: Jul. 5, 2001

(65) Prior Publication Data
US 2003/0163245 A1 Aug. 28, 2003

(30) Foreign Application Priority Data
Dec. 28, 1999 (DE) .......................... 199 63 214

(51) Int. Cl.⁷ ............................................. G06F 19/00
(52) U.S. Cl. ........................................ 701/113; 701/115
(58) Field of Search ................................ 701/113, 114, 701/115; 123/179.3, 179.24, 480, 491, 486

(56) References Cited

U.S. PATENT DOCUMENTS

| 4,838,228 A | * | 6/1989 | Yoneyama | 123/406.35 |
| 5,042,439 A | * | 8/1991 | Tholl et al. | 123/179.2 |
| 5,265,018 A | | 11/1993 | Macqueene et al. | 701/52 |
| 5,419,291 A | * | 5/1995 | Kimata et al. | 123/491 |

FOREIGN PATENT DOCUMENTS

| DE | 44 29 633 | | 2/1996 | |
| EP | 0 296 774 | | 12/1988 | |
| EP | 0 435 082 | | 7/1991 | |
| EP | 0 613 077 | | 8/1994 | |
| JP | 58-112829 A | * | 7/1983 | B60K/41/00 |
| JP | 59-213548 A | * | 12/1984 | B60S/5/00 |
| JP | 60-113042 A | * | 6/1985 | F02D/29/02 |

* cited by examiner

Primary Examiner—Hieu T. Vo
(74) Attorney, Agent, or Firm—Kenyon & Kenyon

(57) ABSTRACT

A method and an apparatus for starting up a control unit for a motor vehicle from a reset state. In order to be able, after startup of the control unit, to continue an operation interrupted by the reset of the control unit at the point where it was interrupted, the following steps are performed: checking whether an operation to be monitored had been initiated prior to the reset of the control unit; continuing the operation to be monitored if the operation to be monitored had been initiated prior to the reset of the control unit; and initiating the operation to be monitored if the operation to be monitored had not been initiated prior to the reset of the control unit, provided the operation to be monitored is to be initiated.

9 Claims, 1 Drawing Sheet

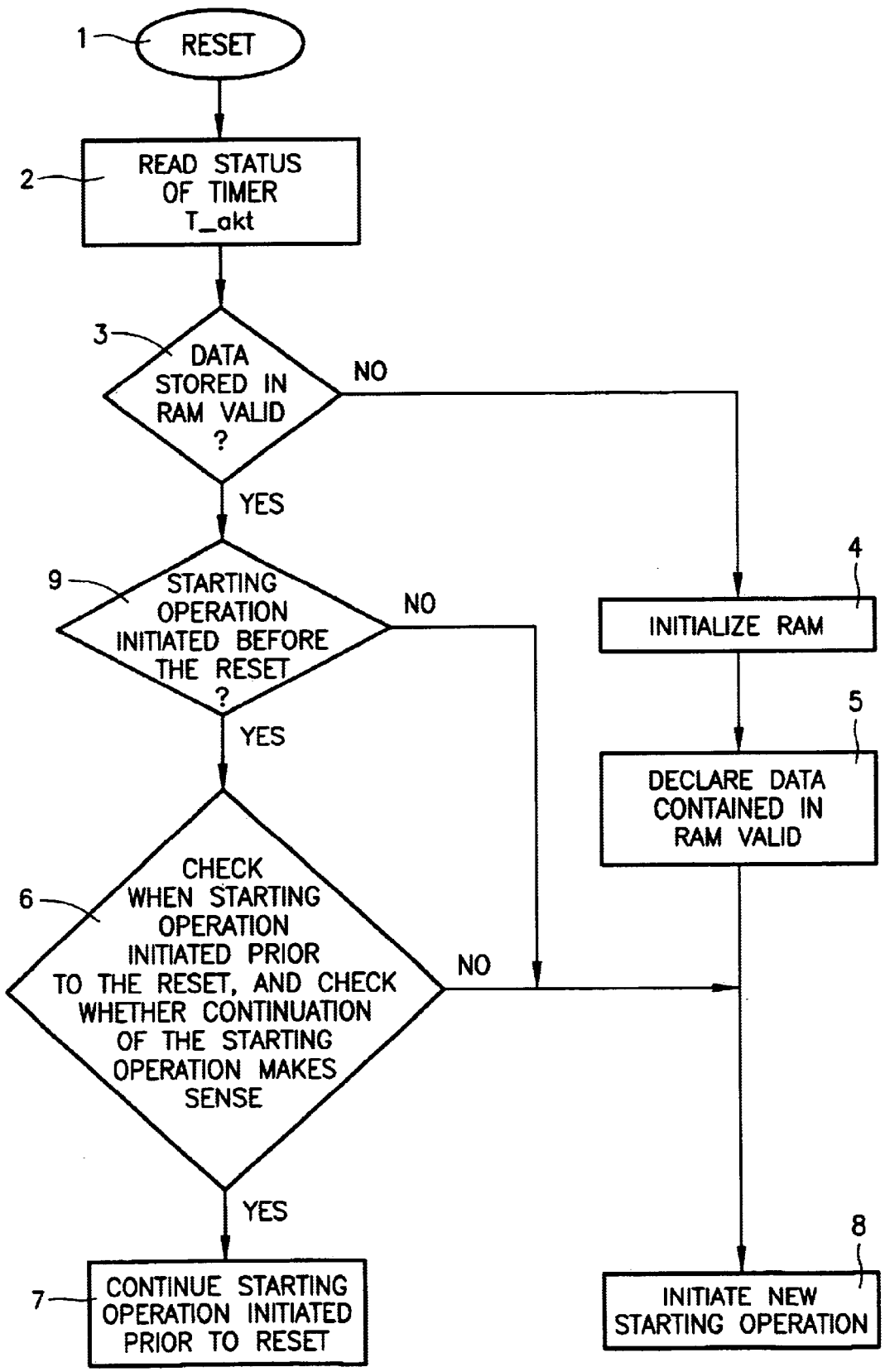

METHOD AND DEVICE FOR RUNNING UP A CONTROL UNIT FOR A MOTOR VEHICLE

FIELD OF THE INVENTION

The present invention relates to a method and an apparatus for starting up a control unit for a motor vehicle from a reset state. The control unit can be used for open-/closed-loop control of specific functions and operations in the motor vehicle, in particular for open-/closed-loop control of the internal combustion engine, transmission, brakes, and heating/air conditioning system.

The control unit can be brought into the reset state by a variety of actions. A first possibility is, for example, an interruption of the supply voltage to the control unit by the fact that an ignition key or main switch is brought into a switched-off position. This type of control unit reset is referred to as a "hardware reset." A second possibility lies in causing a reset of the control unit by way of a control program running on the control unit. This type of control unit reset is referred to as a "software reset." A software reset is performed, for example, if an error occurs during execution of the control program. From the reset state, the control unit as a rule automatically starts up again after outputting an error message. As a third possibility, the control unit can be brought into a reset state if the supply voltage falls below a specific voltage limit value. This type of control unit reset is referred to as an "undervoltage reset." As soon as the supply voltage has once again exceeded the voltage limit value, the control unit as a rule automatically starts back up from the reset state after an undervoltage reset.

A decrease in the supply voltage below the voltage limit value and initiation of an undervoltage reset can occur, for example, during the starting operation of the internal combustion engine of a motor vehicle. At the beginning of the starting operation, a starter is brought closer to the crankshaft of the internal combustion engine and brought into engagement with it, so that a rotational motion of the starter is transferred to the crankshaft and on to the internal combustion engine. Operation of the starter requires a relatively large amount of energy, so that a dip in the supply voltage below the voltage limit value can occur.

BACKGROUND INFORMATION

According to the existing art, the starting operation that is in progress is interrupted by an undervoltage reset, and a new starting operation is initiated after startup of the control unit. In other words, the starter is moved away from the crankshaft at the end of the starting operation that is in progress, and is brought closer to the crankshaft again at the beginning of the re-initiated starting operation. This results in a delay between the individual successive starting operations, and in a not inconsiderable stress on the starting equipment, especially the motor vehicle battery. In addition, the starting capability of the internal combustion engine is relatively poor when many starting operations follow one another at intervals in time, so that starting the internal combustion engine requires a relatively large amount of time.

SUMMARY OF THE INVENTION

It is therefore an object of the present invention to configure and develop a method and an apparatus for starting up a control unit of the kind cited initially in such a way that an operation begun prior to the reset of the control unit is not terminated by the reset of the control unit and initiated again thereafter.

To achieve this object, the present invention proposes, proceeding from the method for starting up a control unit of the kind cited initially, a method and an apparatus which are characterized by the following steps:

checking whether an operation to be monitored had been initiated prior to the reset of the control unit;

continuing the operation to be monitored if the operation to be monitored had been initiated prior to the reset of the control unit; and initiating the operation to be monitored if the operation to be monitored had not been initiated prior to the reset of the control unit.

The operation to be monitored can be, for example, the starting operation of the internal combustion engine of a motor vehicle. During the starting operation of the internal combustion engine, a decrease in the supply voltage below a voltage limit value can occur, so that an undervoltage reset is triggered. Upon startup of the control unit after the undervoltage reset, according to the present invention a check is first made as to whether a starting operation had been initiated before the undervoltage reset of the control unit.

If this is the case, the starting operation begun before the undervoltage reset is continued. As a result of the undervoltage reset only a short interruption in the starting operation occurs, but without terminating it and initiating a new one. In particular, the starter is not moved away from the crankshaft of the internal combustion engine by the undervoltage reset, but rather remains in engagement with the crankshaft. To continue the starting operation, the starter is thus simply actuated again.

If a starting operation of the internal combustion engine had not been initiated before the undervoltage reset of the control unit, a new starting operation is initiated after startup of the control unit. For that purpose, first the starter is brought closer to the crankshaft of the internal combustion engine and brought into engagement with it, so that a rotational motion of the starter is transferred to the crankshaft and thus to the internal combustion engine. Then the starter is actuated.

The starting operation of an internal combustion engine is described here by way of example as one possible operation to be monitored. The undervoltage reset is likewise described as one possible way of resetting the control unit of a motor vehicle. There are conceivable in the motor vehicle sector, however, a plurality of other operations to be monitored that can, with the aid of the method according to the present invention, not be terminated despite a reset of the control unit but rather merely interrupted for a short time, and can be continued again after startup of the control unit. Other relevant operations to be monitored are all the functions of the motor vehicle to be controlled in open- or closed-loop fashion. Open/closed-loop control of the transmission, brakes, power steering, electronic gas pedal, air conditioning and ventilation system of the interior, and active suspension, may be mentioned here in particular.

In the case of a hydraulic or pneumatic level control system of a motor vehicle, for example, it would not be desirable, at each reset of the control unit, to terminate the level control system and decrease the pressure level in the hydraulic or pneumatic system to an idle pressure, i.e. to lower the motor vehicle. After startup of the control unit, the operating pressure would then first need to be built up in order to raise the motor vehicle up to its operating level. With the method according to the present invention, the level control system is merely briefly interrupted by the reset of the control unit and is then, after startup of the control unit, continued again at the point where it was interrupted, i.e. despite the reset of the control unit the pressure level in the hydraulic or pneumatic system, and the operating level of the motor level, are maintained.

According to an advantageous development of the present invention, it is proposed that after the check as to whether the operation to be monitored had been initiated before the reset of the control unit, the following steps are performed:

reading a timer status from a memory, the status of a timer that remains uninfluenced by the reset of the control unit being stored in the memory at the beginning of the operation to be monitored;

comparing the difference between a present timer status and the stored timer status to a maximum timer limit value;

continuing the operation to be monitored if the difference is less than or equal to the maximum timer limit value; and initiating the operation to be monitored if the difference is greater than the maximum timer limit value.

According to this development, the control unit has or has access to a timer that remains uninfluenced by the reset of the control unit. For that purpose the timer is, for example, connected directly to the supply voltage. The status of the timer is ascertained at the beginning of the operation to be monitored, and is stored in a memory. Upon startup of the control unit, the present timer status and the timer status stored in the memory are read out. A difference is calculated between the two timer statuses that are read out. The difference is then compared to a maximum timer limit value.

In the context of the present development it is assumed that when the difference is less than or equal to the maximum timer limit value, an operation to be monitored was begun so recently before the reset of the control unit that the operation should be continued. If, on the other hand, the difference is greater than the maximum timer limit value, this means that while the operation to be monitored was begun before the reset of the control unit, the beginning of the operation lies so far in the past that the operation should not be continued but rather initiated again. The timer limit value can be adapted to the particular operation to be monitored, and can assume different values for different operations. Stated in simplified form: in this development, in the context of an operation initiated before the reset of the control unit, upon startup of the control unit a timer is used to ascertain how much time has elapsed since the beginning of the operation to be monitored, and as a function of the elapsed time a decision is made as to whether the operation should be continued or should be initiated again.

The timer status can be stored, at the beginning of an operation to be monitored, in a memory of any desired configuration. For each operation to be monitored, a separate timer status is stored in a memory. According to a preferred embodiment of the present invention, it is proposed that the timer status be stored, at the beginning of the operation to be monitored, in a read-only memory. The read-only memory is configured, for example, as an electrically erasable programmable ROM (EEPROM) or as a flash EEPROM. The data stored in the read-only memory are retained even if the read-only memory is operated with no supply voltage, i.e. even without an auxiliary battery. The read-only memory is thus not influenced by the reset of the control unit. Upon startup of the control unit from a reset state, it can therefore be assumed that the data stored in the read-only memory are valid.

According to an alternative embodiment of the present invention, it is proposed that the timer status be stored, at the beginning of the operation to be monitored, in a random access read-write memory. The read-write memory is configured, for example, as a random access memory (RAM), in particular as a static RAM (SRAM) or as a dynamic RAM (DRAM). A RAM does not remain uninfluenced by the reset of the control unit. Upon a shutdown of the supply voltage, the voltage present at the RAM slowly decreases with time. When the voltage present at the RAM decreases below a specific limit value, the RAM assumes an undefined state and the data stored therein are invalid. A brief interruption of the supply voltage, for example such as can occur when a control unit is reset and restarted, generally does not result in invalidity of the data stored in the RAM. During the short period of interruption in the supply voltage, the voltage present at the RAM does decrease somewhat, but it generally does not reach the voltage limit value at which the RAM cell flips, i.e. at which the data stored in the RAM become invalid.

According to a further preferred embodiment of the present invention, it is proposed that before the timer status is read out from the read-write memory, the validity of the data stored in the read-write memory is checked. Thus upon startup of the control unit a check is first made as to whether the supply voltage was interrupted for long enough that the voltage present at the read-write memory (RAM) could decrease below the voltage limit value at which the RAM cells flip. This may be the case, for example, if the control unit was brought into the reset state by switching off the ignition key or a main switch, and was started up again only after an extended delay by switching on the ignition key or the main switch.

The power-fail method is advantageously used to check the validity of the data stored in the read-write memory. The power-fail method is a method, known from the existing art, for checking the validity of the data stored in a read-write memory (RAM). The power-fail method is described in detail in German Published Patent Application No. 44 29 633, to which reference is expressly made here. In the power-fail method, a reference cell having a lower data-loss threshold than the other memory cells of the read-write memory is defined. To check the validity of the data stored in the memory cells of the read-write memory, the reference cell is monitored to determine whether it has flipped. If the reference cell has flipped, the data in the memory cells are refreshed. In the context of the present invention, the data stored in the read-write memory are declared invalid if the reference cell has flipped.

If the data stored in the read-write memory are invalid, then according to a preferred embodiment of the present invention the read-write memory is initialized, and the data stored in the read-write memory are then declared valid. The operation to be monitored is then initiated. As already explained above, at the beginning of the operation to be monitored the status of the timer is sensed and is stored in the memory.

Advantageously, the method and apparatus according to the present invention are used to monitor the starting operation of an internal combustion engine. The advantages of the method according to the present invention are particularly applicable in the context of monitoring the starting operation of an internal combustion engine, since the method according to the present invention makes possible a starting operation for the internal combustion engine that places little stress on the battery and the starting equipment.

BRIEF DESCRIPTION OF THE DRAWING

The FIGURE shows a flow chart of a method according to the present invention in accordance with a preferred embodiment.

DETAILED DESCRIPTION

The FIGURE depicts a preferred embodiment of the method according to the present invention for starting up a control unit for a motor vehicle from a reset state. The control unit can be used for open-/closed-loop control of specific functions and operations in the motor vehicle, in particular for open-/closed-loop control of the internal combustion engine, transmission, brakes, and heating/air conditioning system. The method according to the present invention is characterized in that upon startup of the control unit, the operation to be monitored that had been initiated before the reset of the control unit is not initiated again after startup of the control unit, but rather is continued at the point where it was interrupted by the reset of the control unit.

The method depicted in the FIGURE serves to monitor the starting operation of an internal combustion engine of a motor vehicle. At the beginning of the starting operation, first the starter is brought closer to the crankshaft and brought into engagement with it. Actuation of the starter causes a rotational motion of the starter to be transferred to the crankshaft and on to the internal combustion engine. Operation of the starter can result in a decrease in the voltage supply in the motor vehicle. The voltage drop can proceed to the point that the supply voltage decreases below a defined voltage limit value and, for safety reasons, an undervoltage reset of the control unit is performed. As soon as the supply voltage rises above the voltage limit value again, the control unit is, as a rule, automatically started up again.

After startup of the control unit, what is determined is whether the starting operation had already been initiated before the reset of the control unit and needs to be continued after startup of the control unit, or whether the starting operation had not been initiated before the reset of the control unit and a new starting operation needs to be initiated.

At the beginning of the starting operation, the status of a timer is read and is stored in a memory (timer status T_sp).

The timer remains uninfluenced by the reset of the control unit; it is thus, for example, connected directly to the supply voltage. The memory is configured as a random access read-write memory (RAM).

The reset of the control unit is represented in the FIGURE by functional block 1. After the reset of the control unit, the present status of the timer is read out in functional block 2 (timer status T_akt). In a subsequent query block 3, a check is made as to whether the data stored in the RAM, i.e. including the timer status T_sp, are valid. The so-called power-fail method is used to check the validity of the data stored in the RAM. The power-fail method is described in detail in German Published Patent Application No. 44 29 633. To check the validity of the data stored in the RAM using the power-fail method, firstly a reference cell that has a lower data loss threshold than the other memory cells of the RAM is defined. Whereas in the context of a supply voltage of, for example, 4.5 volts in the normal state, the memory cells do not flip until the voltage diminishes to approximately 0.6 to 0.8 volts, the reference cell may flip at a voltage limit value of only approximately 1.5 to 2.5 volts.

To check the validity of the data stored in the RAM, a check is made as to whether the reference cell has flipped. If that is the case, it is assumed that the data stored in the RAM are invalid. In that case execution branches to a functional block 4 in which the RAM is initialized. In functional block 5 the RAM, and the data contained in the RAM after initialization, are then declared valid. A new starting operation is then initiated in a functional block 8. At the beginning of the new starting operation, the status of the timer is read out and is stored in the RAM as the stored timer status T_sp.

If the check in query block 3 indicates that the data stored in the RAM are valid, execution branches to a query block 9. Here a check is made as to whether a starting operation had been initiated before the reset of the control unit. It is conceivable that information about this is also stored in the RAM. In query block 9 this information is then read out of the RAM and evaluated. If no starting operation had been initiated prior to the reset of the control unit, execution branches to functional block 8 and a new starting operation is initiated.

If, on the other hand, a starting operation had been initiated prior to the reset of the control unit, execution branches to a query block 6. Here a check is made as to whether the starting operation initiated prior to the reset of the control unit was initiated too long ago, and whether a continuation of the starting operation makes sense. For that purpose, the timer status T_sp is first read out from the RAM and then checked as to whether the difference between the present timer status T_akt and the stored timer status T_sp is less than or equal to a maximum timer value. If so, execution branches to functional block 7, in which the starting operation initiated prior to the reset of the control unit is continued. The timer limit value selected can be different for each operation to be monitored. A separate timer status T_sp is stored for each operation to be monitored.

If, however, the difference between the present timer status T_akt and the stored timer status T_sp is greater than the maximum timer limit value, the assumption is made that it no longer makes sense to continue the starting operation initiated prior to the reset of the control unit, since it had already been initiated too long ago. Execution branches to functional block 8, where a new starting operation is initiated. At the beginning of the new starting operation, the status of the timer is once again read out and stored in the RAM as a new stored timer status T_sp.

What is claimed is:

1. A system for starting up a control unit for a motor vehicle from a reset state, comprising:

an arrangement for checking whether an operation of an engine of the motor vehicle to be monitored had been initiated prior to a reset of the control unit; and an arrangement for continuing the operation of the engine to be monitored if the operation of the engine to be monitored had been initiated prior to the reset of the control unit.

2. A method for starting up a control unit for a motor vehicle from a reset state, comprising the steps of:

checking whether an operation of an engine of the motor vehicle to be monitored had been initiated prior to a reset of the control unit; and continuing the operation of the engine to be monitored if the operation of the engine to be monitored had been initiated prior to the reset of the control unit.

3. The method according to claim 2, further comprising the step of:

initiating the operation to be monitored if the operation to be monitored had not been initiated prior to the reset of the control unit, provided the operation to be monitored is to be initiated.

4. A method for starting up a control unit for a motor vehicle from a reset state, comprising the steps of:

checking whether an operation to be monitored had been initiated prior to a reset of the control unit;

reading a timer status from a memory, the timer status corresponding to that of a timer that remains uninfluenced by the reset of the control unit and being stored as a stored timer status in the memory at a beginning of the operation to be monitored;

comparing a difference between a present state of the timer status and the stored timer status to a maximum timer limit value;

continuing the operation to be monitored if the difference is less than or equal to the maximum timer limit value; and initiating the operation to be monitored if the difference is greater than the maximum timer limit value.

5. The method according to claim 4, wherein:

the memory includes a read-only memory.

6. The method according to claim 4, wherein:

the memory includes a random access read-write memory.

7. The method according to claim 6, further comprising the step of:

before the timer status is read out from the read-write memory, checking a validity of data stored in the read-write memory.

8. The method according to claim 7, wherein:

the step of checking the validity of the data stored in the read-write memory is performed in accordance with a power-fail operation.

9. The method according to claim 7, further comprising the step of:

if the data stored in the read-write memory are invalid, initializing the read-write memory and then declaring the data stored in the read-write memory valid.

\* \* \* \* \*